(12) United States Patent
Kalam et al.

(10) Patent No.: US 12,146,102 B1
(45) Date of Patent: *Nov. 19, 2024

(54) ENHANCED OIL RECOVERY METHOD AND SYSTEM USING GEMINI SURFACTANT

(71) Applicant: KING FAHD UNIVERSITY OF PETROLEUM AND MINERALS, Dhahran (SA)

(72) Inventors: Shams Kalam, Dhahran (SA); Sidqi Ahmad Mohammad Abu-Khamsin, Dhahran (SA); Shirish Liladhar Patil, Dhahran (SA); Muhammad Shahzad Kamal, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/782,087

(22) Filed: Jul. 24, 2024

Related U.S. Application Data

(63) Continuation of application No. 18/364,580, filed on Aug. 3, 2023.

(51) Int. Cl.
   *C09K 8/584* (2006.01)
   *C09K 8/588* (2006.01)
   *E21B 43/16* (2006.01)

(52) U.S. Cl.
   CPC .............. *C09K 8/584* (2013.01); *C09K 8/588* (2013.01); *E21B 43/16* (2013.01)

(58) Field of Classification Search
   CPC ................................................... C09K 8/584
   See application file for complete search history.

(56) References Cited

U.S. PATENT DOCUMENTS

| | | |
|---|---|---|
| 4,157,115 A | 6/1979 | Kalfoglou |
| 4,288,332 A | 9/1981 | Hall |
| 4,574,885 A | 3/1986 | Horton |
| 11,214,730 B1 | 1/2022 | Ayirala et al. |
| 11,352,549 B2 | 6/2022 | Kanj et al. |

(Continued)

OTHER PUBLICATIONS

Khan, et al. Adsorption Study of Novel Gemini Cationic Surfactant in Carbonate Reservoir Cores—Influence of Critical Parameters (Year: 2022).*

(Continued)

*Primary Examiner* — William D Hutton, Jr.
*Assistant Examiner* — Avi T Skaist
(74) *Attorney, Agent, or Firm* — Oblon, McClelland, Maier & Neustadt, L.L.P.

(57) ABSTRACT

A method of enhanced oil recovery in a carbonate rock formation including, injecting a mixture into the carbonate rock formation containing an oil composition, and extracting the oil composition from the carbonate rock formation. The mixture contains 89-98.9 vol % of an aqueous solution, 0.01-1 vol % of a gemini cationic surfactant, and 0.1-10 vol % of formic acid based on a total volume of the mixture. During the injecting at least a portion of the gemini cationic surfactant is adsorbed onto the carbonate rock formation, and wherein at least 90% less by volume of the gemini cationic surfactant adsorbs onto the carbonate rock formation compared to a method under the same conditions but without the formic acid.

14 Claims, 12 Drawing Sheets

(56) References Cited

U.S. PATENT DOCUMENTS

2015/0354332 A1 12/2015 Kurkal-Siebert et al.
2021/0371726 A1* 12/2021 Kanj ................. E21B 43/162

OTHER PUBLICATIONS

Kalam et al. Adsorption reduction of a gemini surfactant on carbonate rocks using formic acid: Static and dynamic conditions (Year: 2023).*

Kalam et al. ; Adsorption reduction of a gemini surfactant on carbonate rocks using formic acid: Static and dynamic conditions : Fuel vol. 345 ; Mar. 27, 2023 ; 4 Pages.

Dabiri et al. ; Investigation of Interfacial Tension Reduction, Wettability Alteration, and Oil Recovery Using a New Non-ionic Oil-Based Surfactant from Gemini Surfactants Family Coupled with Low-Salinity Water: Experimental Study on Oil-Wet Carbonate Rock ; Journal of Surfactants and Detergents, vol. 23, Issue 4 ; Feb. 24, 2020 ; Abstract Only ; 1 Page.

\* cited by examiner

ENHANCED OIL RECOVERY METHOD AND SYSTEM USING GEMINI SURFACTANT

CROSS-REFERENCE TO RELATED APPLICATIONS

The present application is a Continuation of U.S. application Ser. No. 18/364,580, now allowed, having a filing date of Aug. 3, 2023.

STATEMENT OF PRIOR DISCLOSURE BY INVENTOR

Aspects of the present disclosure are described in S. Kalam, S. A. Abu-Khamsin, S. Patil, M. Mahmoud, M. S. Kamal, M. Murtaza, K. K. Mohanty "Adsorption reduction of a gemini surfactant on carbonate rocks using formic acid: Static and dynamic conditions"; Fuel; Mar. 27, 2023; 345; 128166, incorporated herein by reference in its entirety.

STATEMENT OF ACKNOWLEDGEMENT

Support provided by King Fahd University of Petroleum and Minerals (KFUPM) is gratefully acknowledged.

BACKGROUND

Technical Field

The present disclosure is directed to a method for oil recovery, particularly a method for enhancing oil recovery from carbonate rock formations using a mixture of a gemini surfactant and formic acid.

DESCRIPTION OF THE RELATED PRIOR ART

The description of the related prior art provided herein is for the purpose of generally presenting the context of the disclosure. Work of the presently named inventors, to the extent described in this background section, as well as aspects of the description which may not otherwise qualify as prior art at the time of filing, are neither expressly nor impliedly admitted as prior art against the present invention.

Oil recovery is a multi-step process to obtain oil and gas from a reservoir. Typically, the production rate varies over the lifecycle of a reservoir or a well. Therefore, for optimal oil recovery, various techniques and technologies are employed across several phases depending on the age of the well, formation characteristics, and the cost of operation. Thus, oil recovery methods are grouped into three main categories: primary, secondary, and tertiary processes. In primary recovery, the oil is produced by the natural reservoir energy. After the primary recovery, the secondary stage is introduced, which involves water flooding, pressure maintenance, and gas injection. The tertiary process or enhanced oil recovery (EOR) is employed when crude oil from an oil field is otherwise difficult to extract using primary and secondary techniques.

Studies have shown that carbonate reservoirs contain about 60% of the remaining oil reserves worldwide. However, carbonate rocks are heterogenous, naturally fractured, and categorized as either oil-wet or mixed wet. Rocks can be classified as water-wet, mixed-wet or oil-wet. When the rock is water-wet, water is preferentially in contact with the mineral when oil is the surrounding phase. The rock is said to be oil-wet when oil is the liquid in contact with the rock. The state in between is called intermediate- or mixed-wet.

Moreover, many carbonate rocks show minimal permeability. Because of the complexities associated with carbonate rocks, incremental oil recovery by water flooding of carbonate reservoirs is usually low. Therefore, EOR methods are often necessary for oil recovery from carbonate reservoirs.

EOR methods have been categorized into three techniques: gas injection, thermal injection, and chemical injection. Gas injection uses gases such as natural gas, nitrogen, or carbon dioxide to displace oil. Thermal injection uses heat to heat the crude oil thereby reducing its viscosity and/or vaporizing part of the oil. Chemical injection can involve the use of chemicals to increase the effectiveness of waterflooding. Overall, the chemical EOR methods have shown better results than thermal and gas flooding EOR methods.

The currently utilized chemical EOR processes involve injecting specific liquid chemicals that effectively displace oil because of their phase-behavior properties, decreasing the interfacial tension (IFT) between the displacing liquid and oil. The popular chemicals used include surfactants, polymers, and alkaline solutions. However, the monometallic transitional metal catalysts often used in the process suffer from deactivation, metal particle sintering, and regeneration of the catalysts. Although surfactants are beneficial as EOR agents, they pose several challenges, such as compatibility with high temperature and high salinity (HTHS) environments and cost. On the other hand, a major concern associated with surfactant flooding is the loss of surfactant by adsorption onto the rock surface, which considerably reduces the process' efficiency. Another significant problem associated with the oil recovery from carbonate rocks is the rock's surface charge density, which changes with the solution pH. Thus, achieving a pH at which there is no net charge on the rock surface becomes important in choosing the type of surfactant that can quickly help achieve the no net charge on the surface of the rock.

However, despite recent advances, the drawbacks of current EOR methods, as discussed above, indicate that there is still a need for an improved method for enhanced oil recovery. Specifically, the method should overcome the problems associated with the permeability of the carbonate reservoirs, significantly lower the IFT and be achieved at a low critical micelle concentration to ensure maximum oil and gas recovery. Furthermore, the method should overcome the above problems at an economical cost for rapid industrial adaptability. Accordingly, one object of the present disclosure is to provide a cost-efficient and economically viable method for overcoming the drawbacks of the current state of the LOR procedures.

SUMMARY

In an exemplary embodiment, a method of enhanced oil recovery in a carbonate rock formation is disclosed. The method includes injecting a mixture into the carbonate rock formation comprising an oil composition; and extracting the oil composition from the carbonate rock formation, wherein the mixture comprises 89-98.9 vol % of an aqueous solution, 0.01-1 vol % of a gemini cationic surfactant, and 0.1-10 vol % of formic acid based on a total volume of the mixture, and wherein during the injecting at least a portion of the gemini cationic surfactant is adsorbed onto the carbonate rock formation, and wherein at least 90% less by volume of the gemini cationic surfactant adsorbs onto the carbonate rock formation compared to a method under the same conditions but without the formic acid.

In some embodiments, the carbonate rock formation is at least one selected from the group consisting of limestone and dolomite.

In another embodiment, the carbonate rock formation is limestone and comprises sodium, magnesium, aluminum, silicon, potassium, calcium, titanium, manganese, iron, strontium, and niobium.

In some embodiments, the carbonate rock formation is dolomite and includes magnesium, aluminum, silicon, potassium, calcium, titanium, vanadium, chromium, manganese, iron, copper, strontium, and niobium.

In some embodiments, the carbonate rock formation further includes at least one impurity selected from the group consisting of quartz, montmorillonite, illite, kaolinite, alunite, pyrite, anorthite, halite, and gypsum.

In some embodiments, the carbonate rock formation comprises 0.1-50 wt. % of the at least one impurity, based on a total weight of the carbonate rock formation.

In some embodiments, the carbonate rock formation has a point of zero charge (PZC) of 9.5 to 10.

In an embodiment, a pH of the mixture is below the PZC of the carbonate rock formation.

In an embodiment, the pH of the mixture is from 5-7.5.

In some embodiments, following the injecting a permeability of the carbonate rock formation increases by at least 5 times.

In some embodiments, the mixture consists of the aqueous solution, the gemini cationic surfactant, and formic acid.

In some embodiments, the gemini cationic surfactant is of formula (II)

FIG. 1B is a depiction of a synthesized cationic gemini surfactant (referred to as GS12), according to certain embodiments;

FIG. 2 shows a schematic diagram of a core-flood setup for flooding experiments to estimate the dynamic adsorption of the GS12 on a carbonate rock, according to certain embodiments;

FIG. 3 shows X-ray diffraction (XRD) of absorbents, namely, Indiana limestone, Guelph, and Guff dolomites, according to certain embodiments;

FIG. 4 shows results of a pH drift method used to determine a point of zero charge (PZC) values for the adsorbents, Indiana limestone, Guelph dolomite, and Guff dolomite, according to certain embodiments;

FIG. 5 shows static adsorption of the GS12 on the adsorbents, Indiana limestone, Guelph, and Guff dolomites, according to certain embodiments;

FIG. 6A shows an adsorption isotherm analyzed using standard adsorption isotherm models for Guelph dolomite, according to certain embodiments;

FIG. 6B shows an adsorption isotherm analyzed using standard adsorption isotherm models for Guff dolomite, according to certain embodiments;

FIG. 6C shows an adsorption isotherm analyzed using standard adsorption isotherm models for Indiana limestone, according to certain embodiments;

FIG. 7 shows a comparison of the PZC and pH decrement on adding HCl and formic acid in the GS12, according to certain embodiments;

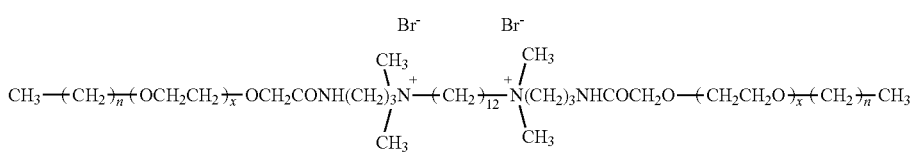

(II)

wherein n is 1 to 20 and x is 1 to 20.

In some embodiments, n is 12, and x is 12.

In some embodiments, the aqueous solution includes at least one ion selected from the group consisting of chloride, sodium, sulfate, magnesium, calcium, and potassium.

In some examples, the aqueous solution includes 1-200,000 ppm of the at least one ion, based on the total mass of the aqueous solution.

In some embodiments, the mixture has a temperature ranging from 70 to 110° C. during injecting the mixture into the carbonate rock formation.

In some embodiment, the gemini cationic surfactant has a critical micelle concentration of 10-20 ppm.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
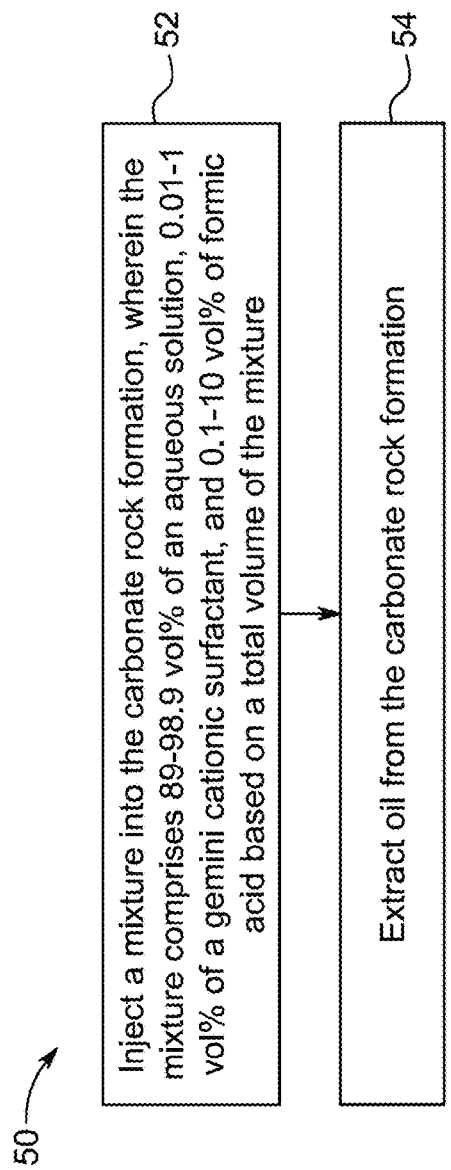
FIG. 1A is a flowchart depicting a method of enhanced oil recovery in a carbonate rock formation, according to certain embodiments.

When describing the present disclosure, the terms used are to be construed in accordance with the following definitions, unless a context dictates otherwise. Embodiments of the present invention will now be described more fully hereinafter with reference to the accompanying drawings wherever applicable, in which some, but not all embodiments of the disclosure are shown.

Further, as used herein, the use of singular includes the plural and the words 'a', and 'an' includes 'one' and means 'at least one' unless otherwise stated in this application.

Furthermore, the terms "approximately", "approximate", "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

The use of the terms "include," "includes", "including," "have," "has," or "having" should be generally understood as open-ended and non-limiting unless specifically stated otherwise.

The term "point of zero charge" or "PZC" refers to the pH at which the net charge of the total particle surface (i.e., absorbent's surface) is equal to zero.

The term "critical micelle concentration" or "CMC" refers to a specific concentration of a surfactant at which micelle formation is first seen in a solution. The CMC would result in micelle formation of all the surfactants added once the specific concentration of the surfactant is achieved.

As used herein, the term "water injection" or "waterflooding" refers to a method of oil recovery in which water or a fluid is injected into a petroleum reservoir to sweep and displace mobile oil from a subterranean geological formation. The water injected increases pressure within the reservoir, replenishing the natural reservoir pressure that has been previously depleted in primary recovery, and physically sweeps the displaced mobile oil to adjacent production wells. Generally, the water or fluid used in a waterflooding process is taken from nearby water sources, and is usually natural seawater, fresh water, produced water (byproduct of the oil industry), aquifer water, river water, artificial saline water or brine.

"Hydrocarbons", "petroleum", "crude oil", "oil", or "oil composition" may be used interchangeably to refer to carbonaceous material originating from subterranean sources as well as synthetic hydrocarbon products, including organic liquids or gases, kerogen, bitumen, crude oil, natural gas or from biological processes, that is principally hydrogen and carbon, with significantly smaller amounts (if any) of heteroatoms such as nitrogen, oxygen and sulfur, and, in some cases, also containing small amounts of metals. Crude oil (e.g., liquid petroleum) and natural gas (e.g., gaseous petroleum) are both hydrocarbons.

As used herein, the terms "reservoir", "oil reservoir" and "petroleum reservoir" refer to a component of a petroleum system (i.e. hydrocarbon or petroleum-generating and storing geologic system) that is composed of a subsurface body of rock formations having sufficient porosity and permeability to store and transmit fluids. Sedimentary rocks are the most common reservoir rocks because they have more porosity than most igneous and metamorphic rocks and form under temperature conditions at which hydrocarbons can be preserved. Depending on the type of sedimentary rock, reservoirs can be classified as carbonate reservoirs having predominantly limestones, and sandstone reservoirs having primarily siliclastic rocks and clay. In one embodiment, the reservoir is a carbonate reservoir, or a sandstone reservoir. In a preferred embodiment, the reservoir is a carbonate reservoir. Alternatively, the reservoir is a tight shale reservoir formed by hydraulic fracturing.

The term "carbonate rock formation" or "carbonate reservoir" refers to any rock which has a carbonate mineral presence unless otherwise expressly disclosed.

As used herein, the terms "bore" and "wellbore" refer to a drilled hole or borehole of a reservoir, including the open hole or uncased portion of the well. In some embodiments, a borehole refers to the inside diameter of the wellbore wall, the rock face that bounds the drilled hole. Depending on the embodiment, a wellbore can be used for injection, production, or both.

Aspects of the present disclosure are directed towards improving the efficiency of surfactant flooding for enhanced oil recovery (EOR) by reducing the adsorption of the surfactant on the surface of the rock. The present disclosure describes a method of surfactant flooding to improve oil recovery by lowering the interfacial tension and/or altering the reservoir rock's wettability. The flooding includes formic acid which reduces an amount of surfactant losses caused by adsorption on the surface of the rock.

FIG. 1A illustrates a flow chart of a method 50 of method of enhanced oil recovery in a carbonate rock formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes injecting a mixture into the carbonate rock formation, also referred to as a carbonate reservoir. The mixture containing an enhanced oil recovery formulation used herein may substantially increase the yield of hydrocarbons from underground reservoirs when injected and are particularly useful for increasing yield of hydrocarbons from carbonate reservoirs.

In some embodiments, the mixture has a temperature of about 70, about 75, about 80, about 90, about 95, about 100 to about 105° C. or about 110° C. during the injecting process. Injection pressures and flow rates of the mixture may be kept constant or varied. In one embodiment, the injection pressure of the mixture is up to 5,000 psi, preferably 50-3,000 psi, preferably 100-1,000 psi. In a related embodiment, the injection flow rate of the mixture is 0.1-50 mL/min, preferably 0.5-20 mL/min, preferably 1-10 mL/min. In one or more embodiments, the reservoir has a temperature of 50-300° C., 75-250° C., 100-200° C., or 150-180° C. In a related embodiment, the reservoir has a pressure of 100-3,000 psi, 200-2,500 psi, 400-2,000 psi, 800-1,500 psi, or 1,000-1,200 psi.

The mixture comprises an aqueous solution, a gemini cationic surfactant, and formic acid. In some embodiments, the mixture includes preferably about 89, about 90, about 91, about 92, about 93, about 94, about 95, about 96, about 97, and about 98 vol. % of the aqueous solution. In a preferred embodiment, the mixture comprises up to about 98.9 vol. % of the aqueous solution based on the total volume of the mixture. In some embodiments, the aqueous solution includes at least one ion selected from the group consisting of chloride, sodium, sulfate, magnesium, calcium, bicarbonate, and potassium.

In some examples, the aqueous solution includes 1-400,000 ppm of at least one ion, based on the total mass of the aqueous solution. In one embodiment, the aqueous solution is saline having a salinity of 10,000 ppm to 400,000 ppm, preferably 50,000 ppm to 300,000 ppm, more preferably 100,000-200,000 ppm. In a preferred embodiment, the aqueous solution is seawater having a salinity of 40,000 ppm to 80,000 ppm, preferably 50,000 ppm to 70,000 ppm, more preferably 55,000 ppm to 60,000 ppm. In one embodiment, the seawater is natural seawater or simulated seawater having sodium present at a concentration of 5-40 g/L, 10-30 g/L, or about 18 g/L, calcium present at a concentration of 0.25-2 g/L, 0.5-1.5 g/L, or about 0.7 g/L, magnesium present at a concentration of 0.5-4 g/L, 1-3 g/L, or about 2 g/L, sulfate present at a concentration of 2-8 g/L, 3-6 g/L, or about 4 g/L, chloride at a concentration of 15-60 g/L, 20-40 g/L, or about 30 g/L, and bicarbonate present at a concentration of 0.05-0.2 g/L, 0.08-0.15 g/L, or about 0.1 g/L, each relative to a total volume of the aqueous solution. In certain embodiments, when the aqueous solution is natural seawater, the solution may further contain microbial components and other organic pollutants that can be optionally removed prior to the oil recovery process. In another preferred embodiment, the aqueous solution is formation water having a salinity of 100,000 ppm to 400,000 ppm, preferably 150,000 ppm to 300,000 ppm, more preferably 200,000 ppm to 250,000 ppm. In one embodiment, the formation water is natural formation water or simulated formation water having sodium present at a concentration of 30-100 g/L, 50-80 g/L, or about 60 g/L, calcium present at a concentration of 8-40 g/L, 15-30 g/L, or about 20 g/L, magnesium present at a concentration of 1-5 g/L, 2-4 g/L, or about 2.5 g/L, sulfate present at a concentration of 0.1-1 g/L, 0.2-0.6 g/L, or about 0.4 g/L, chloride at a concentration of 60-200 g/L, 100-160 g/L, or about 130 g/L, and bicarbonate present at a concentration of 0.1-1 g/L, 0.2-0.5 g/L, or about 0.4 g/L, each relative to a total volume of the solution.

In an embodiment, the mixture includes a gemini cationic surfactant. Gemini surfactants contain two hydrophilic head groups and two hydrophobic tails linked by a spacer at the head groups or close to them. When both hydrophobic parts are the same and hydrophilic groups are identical, then the gemini surfactant forms a symmetric structure. The spacer can be either hydrophobic or hydrophilic. A general structure for the gemini surfactant is shown in Formula (I) below.

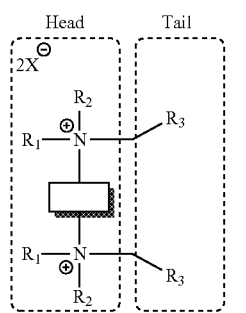

(I)

In Formula (I), X is Cl, Br, or I. $R_1$ and $R_2$ are each independently an alkyl group with 1-10 carbon atoms, preferably 2-9, 3-8, 4-7, or 5-6 carbon atoms. $R_3$ is a hydrophobic tail or chain having 1-100 carbon atoms in the chain, preferably 5-80, 10-50, or 15-30 carbon atoms and may include functional groups such as alkenes, alkynes, ketones, ethers, esters, aldehydes, amides, and amines. The atoms in the hydrophobic chain may be a straight or branched, or in a cyclic structure that is aromatic or non-aromatic. The spacer includes 1-20 carbons in a chain and may include functional groups such as ketones, ethers, esters, aldehydes, alcohols, sulfides, alkynes, amides, and amines. The atoms in the spacer may be in a straight or branched chain, or in a cyclic structure that is aromatic or non-aromatic.

In preferred embodiments (see also FIG. 1B), the gemini cationic surfactant is of formula (II) below.

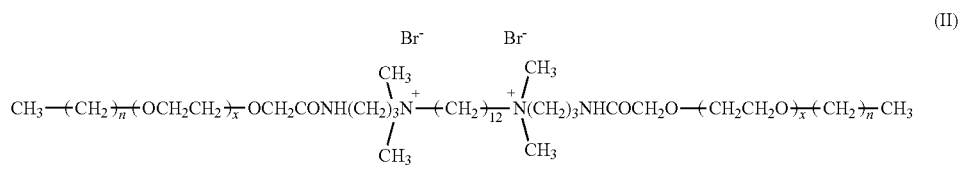

(II)

In Formula (II), n is 1 to 20, and x is 1 to 20. The spacer as depicted in Formula (II) is a carbon chain with 12 carbon atoms, however one of ordinary skill in the art would recognize that the length could be modified from 1 to 20 carbon atoms, preferably 3-17, or 5-15 carbon atoms. The counter ion or X in Formula (II) is Br, however one of ordinary skill in the art would recognize that X could be modified to be Cl or I. The hydrophobic tails include a carbon chain with functional groups such as ethers and amides.

In some embodiments, n is preferably 1, preferably 2, preferably 3, preferably 4, preferably 5, preferably 6, preferably 7, preferably 8, preferably 9, preferably 10, preferably 11, preferably 12, preferably 13, preferably 14, preferably 15, preferably 16, preferably 17, preferably 18, preferably 19, preferably 20 and x is preferably 1, preferably 2, preferably 3, preferably 4, preferably 5, preferably 6, preferably 7, preferably 8, preferably 9, preferably 10, preferably 11, preferably 12, preferably 13, preferably 14, preferably 15, preferably 16, preferably 17, preferably 18, preferably 19, preferably 20. In some preferred embodiments, n is 12 and x is 12.

In an embodiment, the mixture includes 0.01-1 vol % of a gemini cationic surfactant, based on the total volume of the mixture, preferably 0.05-0.5 vol %, or 0.08-0.12 vol %. In a preferred embodiment, only one gemini cationic surfactant is included in the mixture. In a preferred embodiment, only one surfactant is included in the mixture.

In some embodiments, the gemini cationic surfactant has a critical micelle concentration (CMC) of about 10 ppm, 11 ppm, 12 ppm, 13 ppm, 14 ppm, 15 ppm, 16 ppm, 17 ppm, 18 ppm, 19 ppm to about 20 ppm. In a preferred embodiment, the gemini cationic surfactant has a critical micelle concentration of about 20 ppm. The low CMC of the surfactant reduces the amount of surfactant adsorbed onto carbonate rock surface. The surfactant of formula (II) exhibits good thermal stability at up to a temperature of 90-300° C., preferably 120-250° C., more preferably 180-220° C. In one or more embodiments, the surfactant of formula (II) is miscible in the aforementioned aqueous solution (e.g., seawater, formation water) at a temperature of 4-95° C., 10-90° C., 20-80° C., 30-60° C., or 40-50° C.

The aqueous solution further includes an acid or a combination of acids. The acid may be selected from a group including formic acid, HCl, sulfuric acid, acetic acid, and pelargonic acid. In a preferred embodiment, only one acid is included. In a most preferred embodiment, the only acid is formic acid. In some embodiments, the mixture further includes about 0.1, about 0.2, about 0.3, about 04, about 0.5, about 0.6, about 0.7, about 0.8, about 0.9, about 1, about 1.5, about 2, about 2.5, about 3, about 3.5, about 4, about 4.5, about 5, about 5.5, about 6, about 6.5, about 7, about 8, about 8.5, about 9 to about 9.5 vol. % of the formic acid based on the total volume of the mixture. In a preferred embodiment, the mixture includes 1 vol. % of the formic acid based on the total volume of the mixture. The formic acid used in the present method may include different forms, formulations, and precursors of the formic acid. Thus, the method may include the formic acid, organic or inorganic salts of the formic acid, formate esters, formamide, or N-substituted formamides. Typically, the organic salts of the formic acid are mono-, di-, and tri-substituted ammonium formate, while the inorganic salts of the formic acid include ammonium formate and alkali metal salts of the formic acid. Preferably, the formate esters, include formate esters are alkyl formates and aryl formats, and some exemplary N-substituted formamides include methyl formamide, dimethyl formamide, ethyl formamide, and diethyl formamide. The formic acid may include any derivatives or modified forms of the esters or substituted amides. In some embodiments, the formic acid used is a combination of formate esters, an organic and/or inorganic salt, and any substituted formamide. In some embodiments, the mixture consists of the aqueous solution, the gemini cationic surfactant, and formic acid.

The carbonate rock formation can be selected from rocks of sedimentary and metamorphic origin, such as limestone, chalk, marble, or dolomite, preferably, limestone and dolomite. In a preferred embodiment, the carbonate rock formation is limestone. The limestone includes sodium, magnesium, aluminum, silicon, potassium, calcium, titanium, manganese, iron, strontium, and niobium. In some embodiments, the carbonate rock formation is dolomite. The dolomite includes magnesium, aluminum, silicon, potassium, calcium, titanium, vanadium, chromium, manganese, iron, copper, strontium, and niobium. In some embodiments, the carbonate rock formation is a combination of sedimentary and metamorphic rocks. In some preferred embodiments, the carbonate rock formation is one of Guelph dolomite, Guff dolomite, Indiana limestone, or a combination thereof.

Typically, the carbonate rock formation includes varying concentrations of impurities. Such impurities include clay and minerals such as silica, flint, and quartz, which may be present in different forms. The carbonate rock formation of the present disclosure includes at least one impurity selected from the group consisting of quartz, montmorillonite, illite, kaolinite, alunite, pyrite, anorthite, halite, and gypsum. In some embodiments, the carbonate rock formation includes 0.1-50 wt. % of at least one impurity, based on the total weight of the carbonate rock formation. In some embodiments, the carbonate rock formation includes preferably about 0.1 to 1, preferably 2 to 10, preferably 11 to 20, preferably 21 to 30, preferably 31 to 40, preferably 41 to 49 wt. % of the at least one impurity, based on the total weight of the carbonate rock formation. Some impurities may also be present in traces (less than 0.1 wt. %), such as anhydrite, opal, oxides, and sulfides of iron, magnesite, fluorite, etc. In some embodiments, the carbonate rock formation includes a sandstone rock impurity. In some embodiments, the carbonate rock formation may be at least partially or fully saturated with one or more fluids, such as crude oil, an aqueous solution, another fluid, or combinations of these. In a preferred embodiment, the carbonate rock formation includes an oil composition that contains crude oil.

The impurities affect the adsorption of the surfactant on the carbonate rock formation, therefore the point of zero charge (PZC) is measured. In an embodiment, the carbonate rock formation has a PZC of 9.5 to 10. In a preferred embodiment, the pH of the mixture is below the PZC of the carbonate rock formation. In an embodiment, the pH of the mixture is from 5-7.5, preferably 5.5-7 or 6-6.5. If the solution pH is lowered below the corresponding PZC of the rock, the net positive surface charge on the adsorbent will help repel the surfactant leading to adsorption reduction.

During injecting, at least a portion of the gemini cationic surfactant is adsorbed onto the carbonate rock formation, and at least 90% less, preferably 92%, 94%, 96%, 98%, or 99% less by volume of the gemini cationic surfactant adsorbs onto the carbonate rock formation compared to a method under the same conditions but without the formic acid. In other words, the addition of the formic acid decreases the amount of surfactant that adsorbs onto the rock formation. As the surfactant is an expensive component of the mixture it is economically important that less of the surfactant is lost in the flooding process.

Another problem associated with oil extraction from the carbonate rock formations is the low permeability of the rocks down to less than 50 mD. One of the advantages of the method of the present invention is the effects on the permeability of the carbonate rock formation. Thus, in some embodiments, following injection of the mixture, the permeability of the carbonate rock formation increases by at least 5 times, preferably 6, 7, 8 or 9 times. For example, the permeability of a rock may increase from 50-60 mD to 500-600 mD following the injecting. In some examples, the permeability of the rocks increases by more than 5 times depending upon the amount and type of impurities present in the rocks.

While not wishing to be bound to a single theory, it is thought that the combination of the low CMC of the surfactant and the pH of the mixture result in a lower adsorption of the surfactant. Also, the carboxyl group released by the formic acid-rock reaction shields the surfactant from the rock surface resulting in lower adsorption. Other acids do not provide the same results and only a small amount of formic acid is needed which thereby improves the economic viability. Further, the ability of the formic acid to create wormholes in the rock formation thereby increasing permeability, results in an improved method of enhanced oil recovery.

At step 54, the method 50 includes extracting the oil composition from the carbonate rock formation. In an embodiment. An amount of oil extracted is at least 10% greater, preferably 20%, 30%, 40%, 50%, 60%, 70%, 80%, or 90% greater than if the mixture was not injected into the rock formation. The method of recovering hydrocarbons may be performed by injecting the mixture into a first wellbore (e.g. an injection wellbore) connected to the reservoir and then collecting hydrocarbons from a second wellbore (e.g. a production wellbore) that is connected to the reservoir. Alternatively, the method may be performed by injecting the mixture into a wellbore connected to the reservoir, and then collecting hydrocarbons from the same wellbore.

Examples

The following examples demonstrate a method of enhanced oil recovery in a carbonate rock formation as described herein. The examples are provided solely for illustration and are not to be construed as limitations of the present disclosure, as many variations thereof are possible without departing from the spirit and scope of the present disclosure.

Example 1: Materials

Figure 1B:
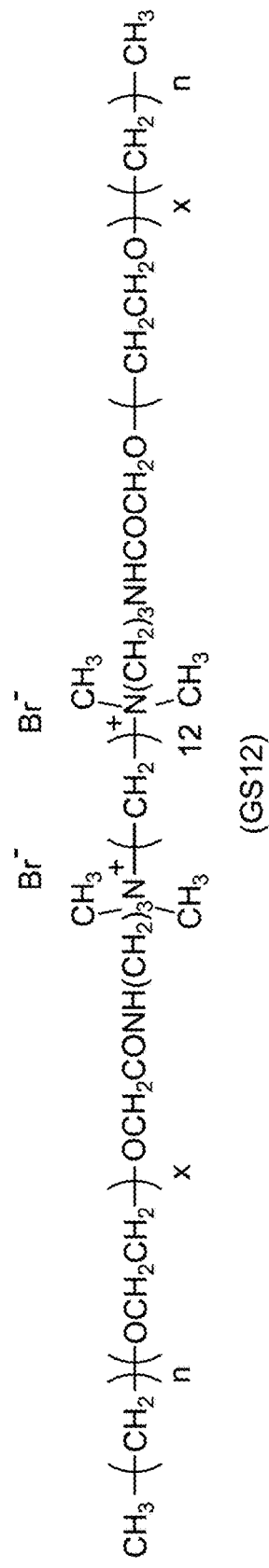

Adsorbents: Samples of Guelph dolomite, Guff dolomite, and Indiana limestone were used as adsorbents. The rock samples were crushed to powder and sieved to obtain a uniform particle size (90-180 μm).

gemini surfactant: The in-house-synthesized gemini surfactant (also referred to herein as 'GS12') used in the present examples is cationic in nature and is quaternary ammonium with bromide counter ions (FIG. 1B). The GS12 spacer length is C12, and the hydrophobic tail is also C12; hence the GS12 is a 12-12-12 gemini surfactant. The GS12 surfactant is tolerant of high temperature and high salinity (HTHS) environments because of the appropriate positioning of ethoxy units between the hydrophilic head and hydrophobic tail units [Hussain, S. M.; Kamal, M. S.; Murtaza, M., Synthesis of Novel Ethoxylated Quaternary Ammonium gemini Surfactants for Enhanced Oil Recovery Application. Energies (Basel), 2019, 12, 1731], incorporated herein by reference in its entirety. One of the most interesting features of the GS12 is having an extremely low CMC value of about $8.26 \times 10^{-6}$ mol/L (15.5 ppm).

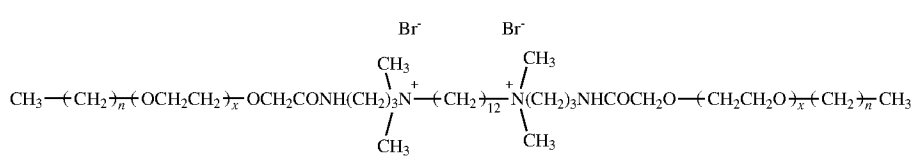

(GS12)

Example 2: Rock Characterization X-Ray Diffraction (XRD) and X-Ray Fluorescence (XRF) Techniques XRD and XRF were employed on the rock powders to determine the rock's mineralogical and elemental compositions, respectively.

Example 3: Determination of the Point of Zero Charge (PZC)

PZC is the pH value where the rock surface charge is neutral. If the pH value decreases below the PZC, the rock surface carries a net positive charge and if the pH value is above the PZC the rock surface carries a net negative charge. The PZC of each adsorbent was determined by the pH drift method using 0.01 M NaCl solution as the background electrolyte. 30 mL samples of the background solution were prepared with pH values ranging between 4 and 11. The adsorbent (0.2 g) was added to each sample, and the final pH was noted after 24 hours. A plot of the difference between the initial and final pH values revealed the PZC at which such difference was zero.

Example 4: High-Performance Liquid Chromatography

The concentration of the surfactant after adsorption tests was determined using high-performance liquid chromatography (HPLC) coupled with an evaporative light scattering detector (ELSD). The mobile phases were 0.1 M ammonium formate altered to pH 4.50 using the formic acid and acetonitrile. A reversed-phase column—Acclaim™ surfactant plus having 3p m average particle size of the packing, 4.6 mm in diameter and 150 mm in length, was employed for detecting the GS12. The gradient method used in the reversed-phase HPLC for the current study is shown in Table 1.

TABLE 1

Gradient methodology of HPLC

| Time, min | Acetonitrile | Ammonium formate (pH = 4.5) | Flow rate (ml/min) |
|---|---|---|---|
| 0 | 0 | 100 | 1 |
| 10 | 100 | 0 | 1 |
| 11 | 0 | 100 | 2 |

The calibration curve was constructed using surfactant solutions with known concentrations. The ELSD area of the investigated fluid was then used to find the concentration.

Example 5: Static Adsorption Tests

Static adsorption tests were performed using 1 gram of powdered adsorbents in 15 ml of GS12 at several concentrations. The mixture was shaken for 24 hours and then centrifuged for 30 minutes at 3000 rpm. Static adsorption can be determined by Eq. 1.

$$\Gamma_{static} = \left(\frac{\Delta C}{1000 m_R}\right) V_S \quad (1)$$

where (mg/g-rock) is the amount of surfactant adsorbed on the adsorbent's surface, = where $C_o$(ppm) and C (ppm) are the surfactant's initial and final concentrations, respectively, $V_s$ (ml) is the volume of the surfactant solution, and mR (g) is the mass of the powdered adsorbent.

Example 6: Dynamic Adsorption Experiments

Figure 2:
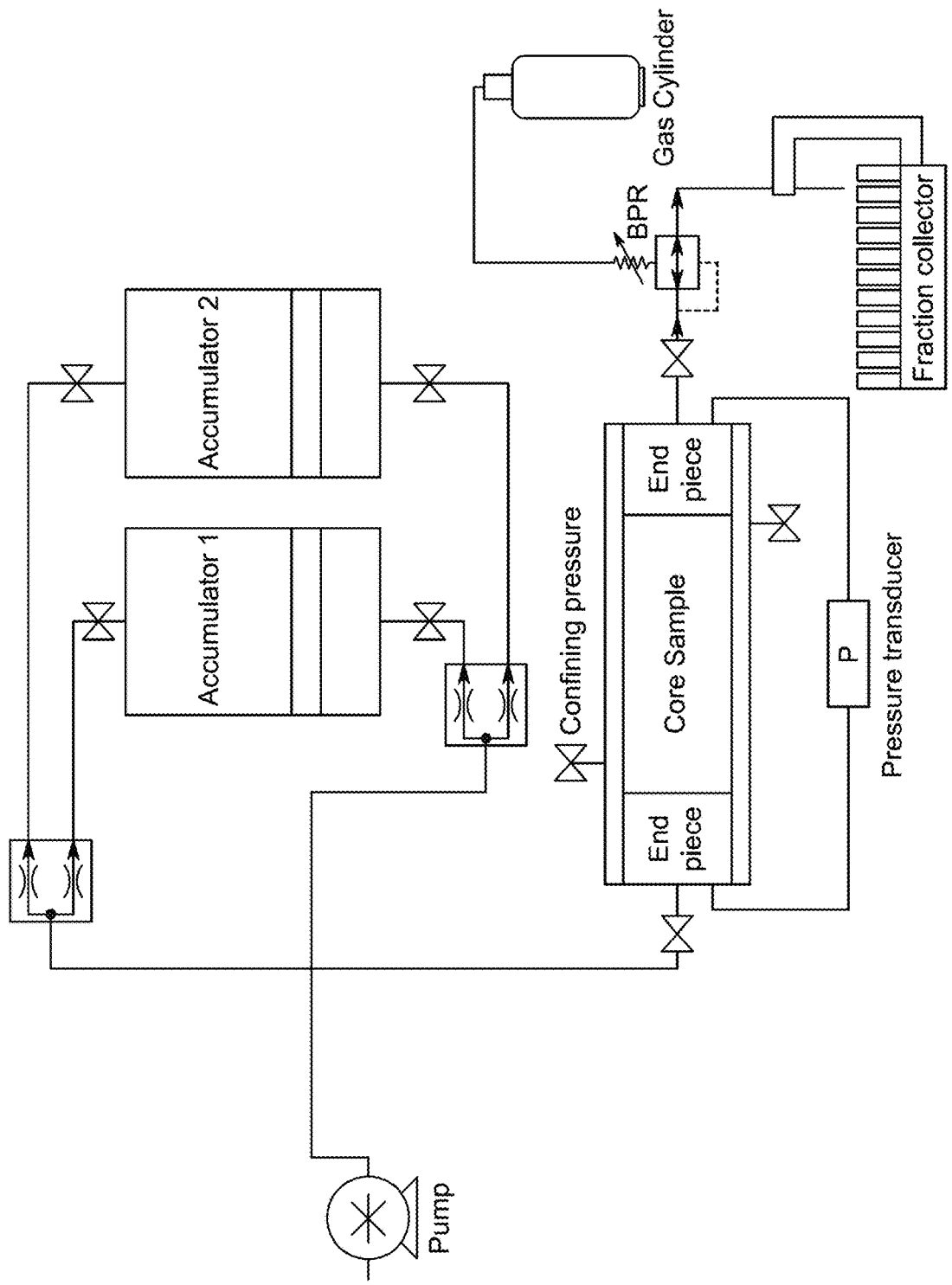

Flooding experiments were conducted on Indiana limestone core samples to estimate the dynamic adsorption of the GS12 on the carbonate rock. FIG. 2 shows a schematic diagram of the core-flood setup. The typical steps of the core flood proceeded as follows: (a) the core sample was flooded with several pore volumes of deionized water (base fluid) to ensure complete saturation, (b) the sample was then flooded with about 20 pore volumes of the surfactant solution until the core effluent showed approximately the same concentration as the injected solution, and (c) the sample was flooded with base fluid to capture the desorption behavior. Waterflooding was continued until no surfactant peaks were observed in the HPLC system. All tests were performed at 0.25 mL/min injection rate, 2500 psi confining pressure, 1500 psi back pressure, and ambient temperature conditions. Dynamic adsorption was computed by Eq. 2.

$$\Gamma_{dymanic} = \frac{C_0 V - \sum_{i=1}^{N} C_i V_i}{m} \quad (2)$$

where (mg/g-rock) is the adsorption of the surfactant on Indiana limestone, $C_0$ (ppm) is the initial surfactant concentration, V is the total volume of injected surfactant solution (L), $C_i$ (ppm) and $V_i$ are the surfactant concentration and volume of the effluents collected at different period, m (g) is the total mass of the dry core sample, and N is the total number of collected effluent samples.

Example 8: Langmuir Adsorption Isotherm Model

The Langmuir isotherm (Eq. 3) is the most well-known and often-used model to describe adsorption equilibrium. Originally derived for gas-solid interaction, it is utilized for different adsorbents. The equation is applicable under the following conditions: homogenous sites, constant adsorption energy, monolayer adsorption, and no lateral interaction between the adsorbed molecules.

$$q_e = \frac{q_m K_L C_e}{1 + K_L C_e} \quad (3)$$

where $q_e$ is the adsorption at equilibrium time in mg/g, $q_m$ is the maximum amount of adsorbed surfactant in mg/g, KL is the Langmuir constant in L/mg, and $C_e$ is the adsorbate's equilibrium concentration in mg/L.

Example 9: Freundlich Adsorption Isotherm Model

The Freundlich empirical model can be utilized for multilayer adsorption on heterogeneous sites. The equation is based on the hypothesis that the adsorption heat distribution and the affinities for the heterogeneous surface are not uniform. The mathematical model is expressed by Eq. 4:

$$q_e = K_F C_e^{1/n} \quad (4)$$

where 1/n is the adsorption intensity or surface heterogeneity, and $K_F$ is the adsorption capacity in L/mg. Adsorption is deemed to be beneficial when 0<1/n<1. At 1/n>1, unfavorable adsorption develops; at 1/n=1, it becomes irreversible.

Example 10: Redlich-Peterson Isotherm

The Redlich-Peterson isotherm (Eq. 5) is a three-parameter adsorption isotherm that combines elements of the Langmuir and Freundlich isotherms and, as a result, does not obey ideal monolayer adsorption. The Redlich-Peterson isotherm is a hybrid version that can be applied to homogeneous and heterogeneous systems.

$$q_e = \frac{K_r C_e}{1 + \alpha C_e^{\beta}} \quad (5)$$

where β is the exponent ranging between 0 and 1, Kr is the Redlich-Peterson isotherm constant in L/g, and α is a constant in L/mg. The model approaches the Langmuir isotherm at low concentrations and the Freundlich isotherm at high concentrations.

Example 11: Rock Characterization

Figure 3:
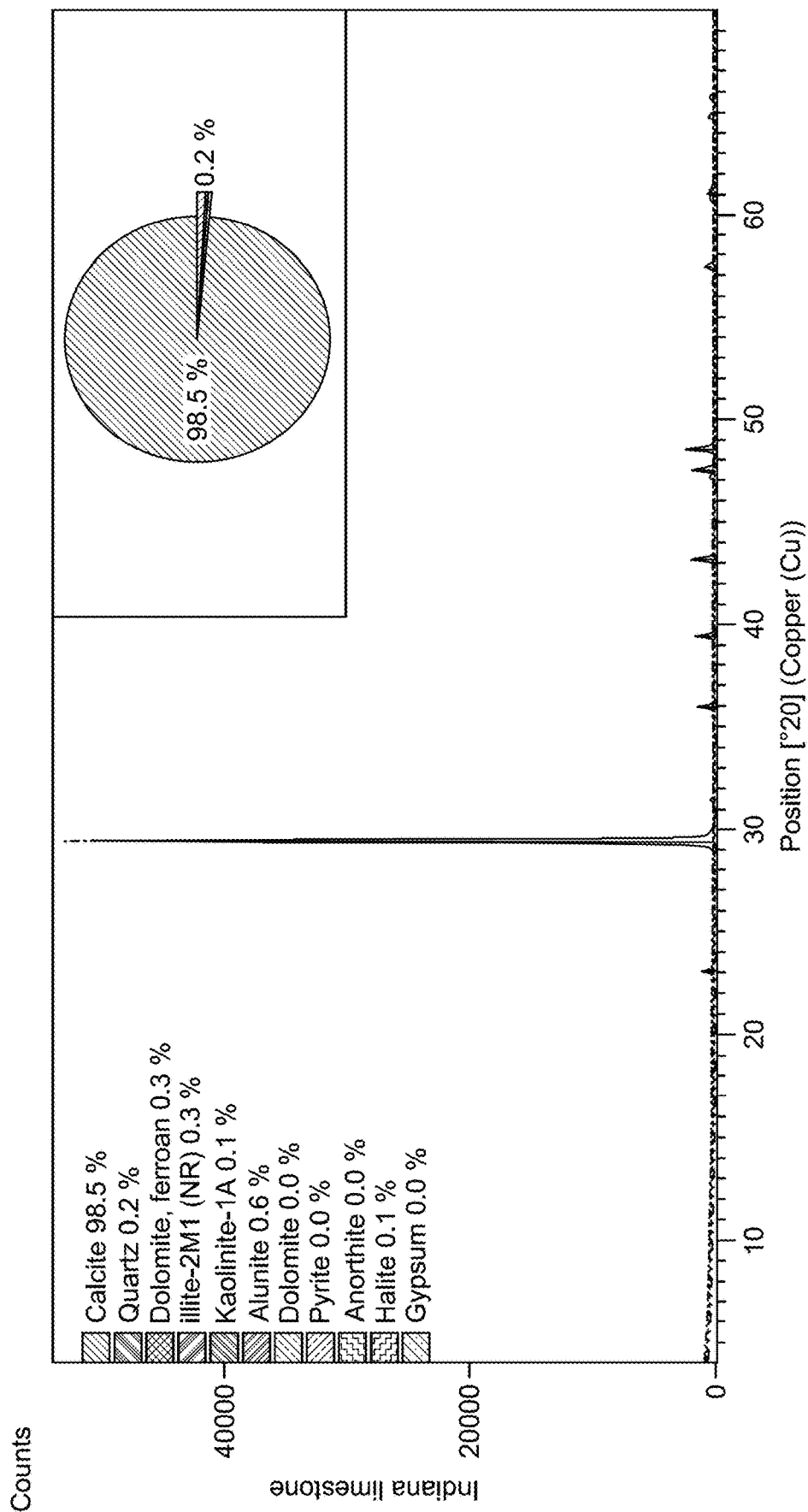
Figure 3:
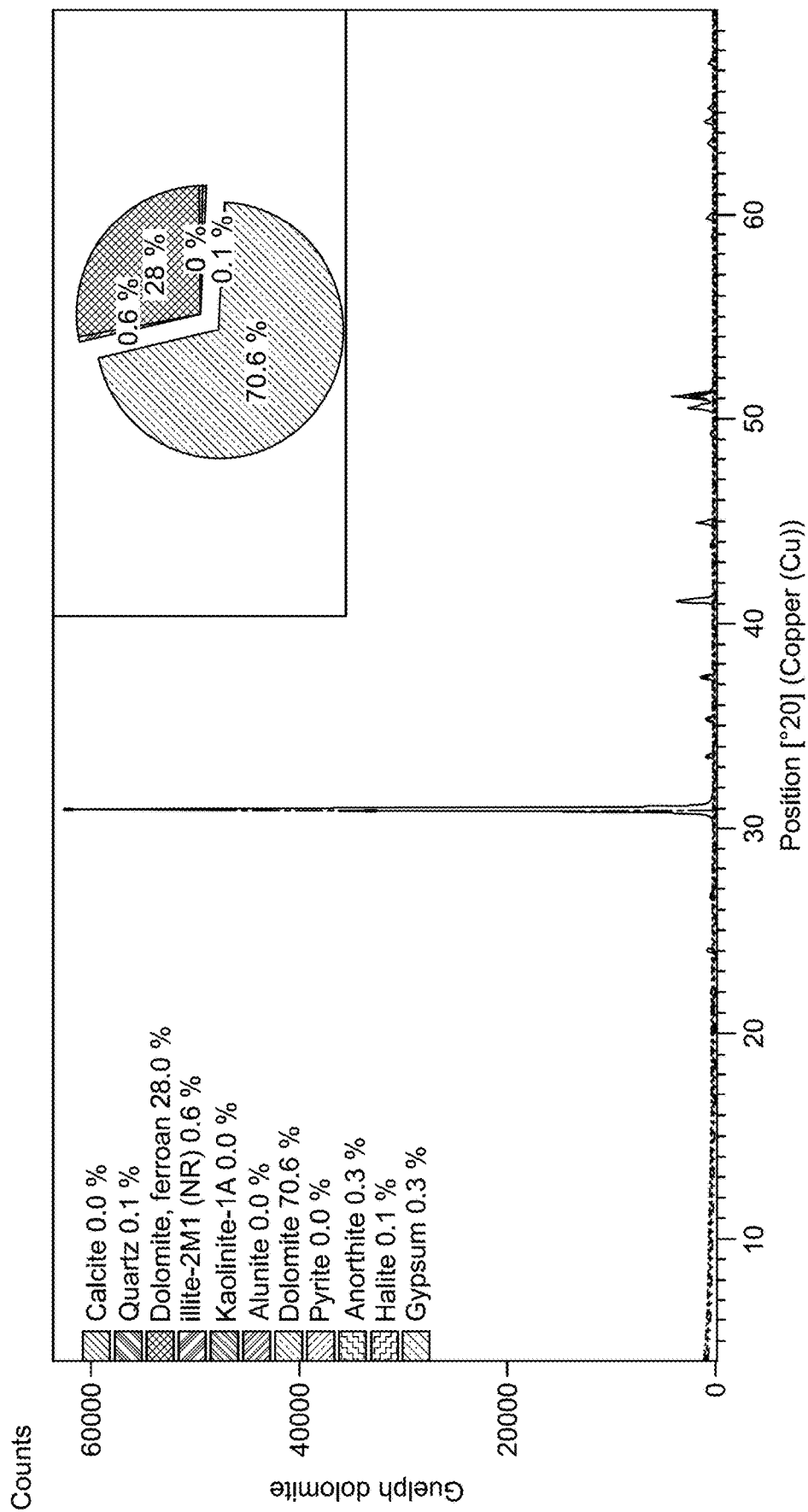
Figure 3:
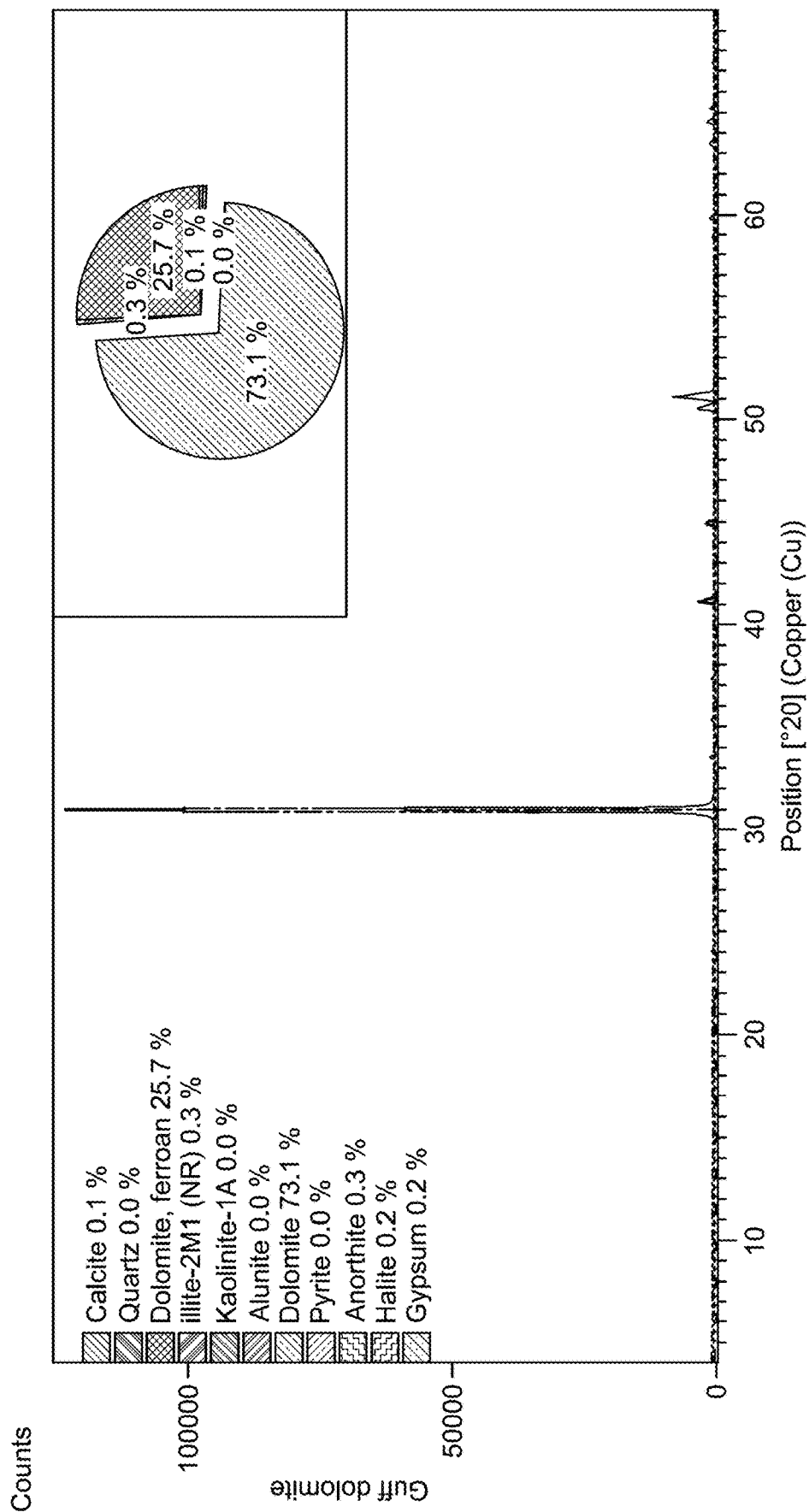

Referring to FIG. 3, XRD and XRF tests on the 3 rock samples show that Indiana limestone contains mainly calcite along with 0.2% quartz, 0.3% Illite, and 0.1% Kaolinite (Table 2). On the other hand, Guelph and Guff dolomites contain impurities such as Illite (0.6% and 0.3%, respectively) and quartz (0.1% in Guelph) but no Kaolinite. The total clay content in Guelph dolomite is higher than in Guff dolomite.

TABLE 2

XRF of adsorbents

| Element | Indiana Limestone | Guelph Dolomite | Guff Dolomite |
|---|---|---|---|
| Na | 0.22 | 0.00 | 0 |
| Mg | 0.41 | 26.01 | 25.82 |
| Al | 0.31 | 0.47 | 0.50 |
| Si | 0.44 | 1.16 | 1.57 |
| K | 2.99 | 0.37 | 0.50 |
| Ca | 94.68 | 71.08 | 70.95 |
| Ti | 0.01 | 0.05 | 0.05 |
| V | 0.00 | 0.02 | 0.02 |
| Cr | 0.00 | 0.01 | 0.01 |
| Mn | 0.05 | 0.03 | 0.03 |
| Fe | 0.73 | 0.69 | 0.46 |
| Cu | 0.00 | 0.01 | 0.01 |
| Sr | 0.14 | 0.07 | 0.07 |
| Nb | 0.01 | 0.02 | 0.02 |

Example 12: Adsorption Studies

Figure 4:
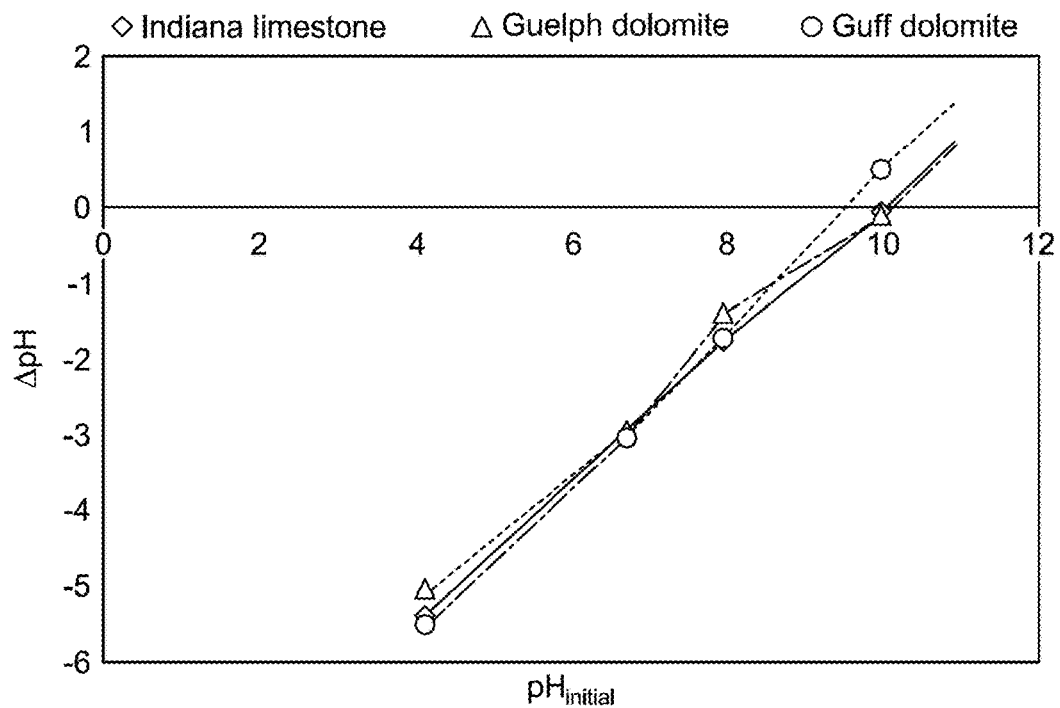

Referring to FIG. 4, the results of the pH drift method are shown. Table 3 lists the PZC values of Indiana limestone, Guelph dolomite, and Guff dolomite are 9.98, 9.98, and 9.57, respectively. This indicates that if the solution pH is lowered below the corresponding PZC of the adsorbent, the net positive surface charge on the adsorbent will help repel the cationic GS12 leading to adsorption reduction.

TABLE 3

PZC values of all adsorbents

| Rock type | PZC |
|---|---|
| Indiana limestone | 9.98 |
| Guelph Dolomite | 9.98 |
| Guff Dolomite | 9.57 |

Figure 5:
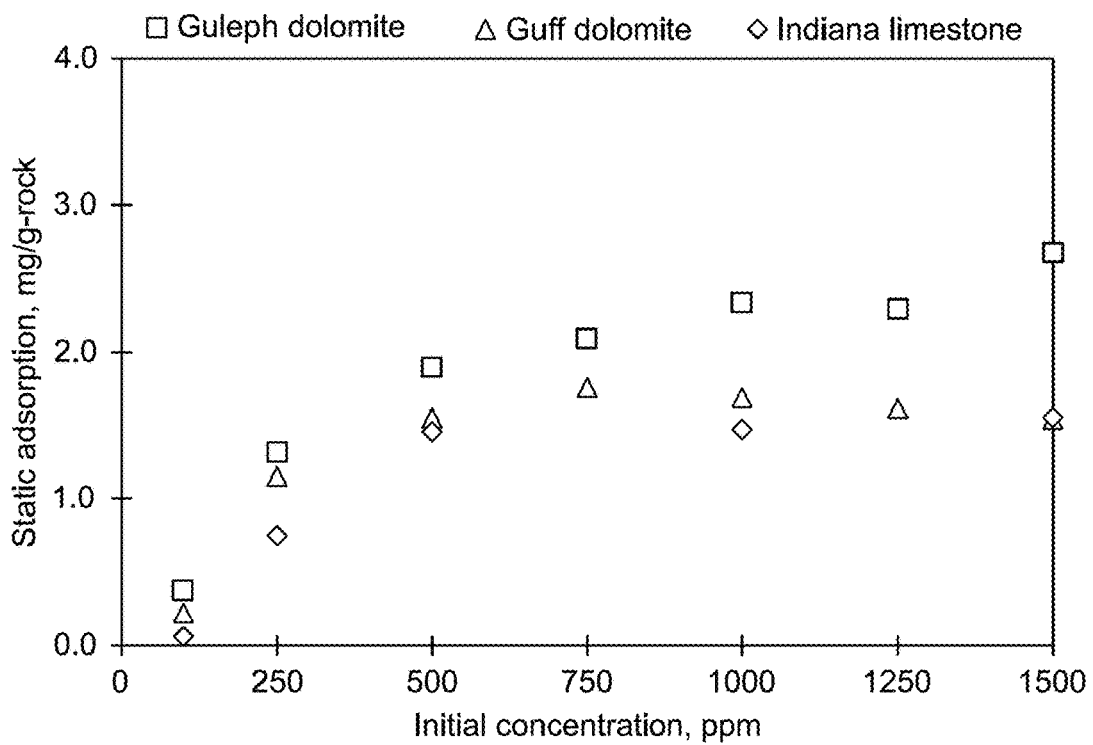

FIG. 5 presents the results obtained from static adsorption tests of GS12 on the rock samples. Surfactant adsorption on all rocks rises with the increase in concentration. The adsorption plateau was obtained at around 1000 ppm surfactant concentration. The average adsorption values in the plateau region for Indiana limestone, Guelph dolomite, and Guff dolomite were about 1.51 mg/g-rock, 2.44 mg/g-rock, and 1.62 mg-g-rock, respectively. The adsorption on all adsorbents took place due to the presence of negative binding sites of silicate and/or clay minerals. Guelph dolomite contains the largest fraction of clay minerals, which caused the highest degree of adsorption compared to the two other adsorbents.

Figure 6A:
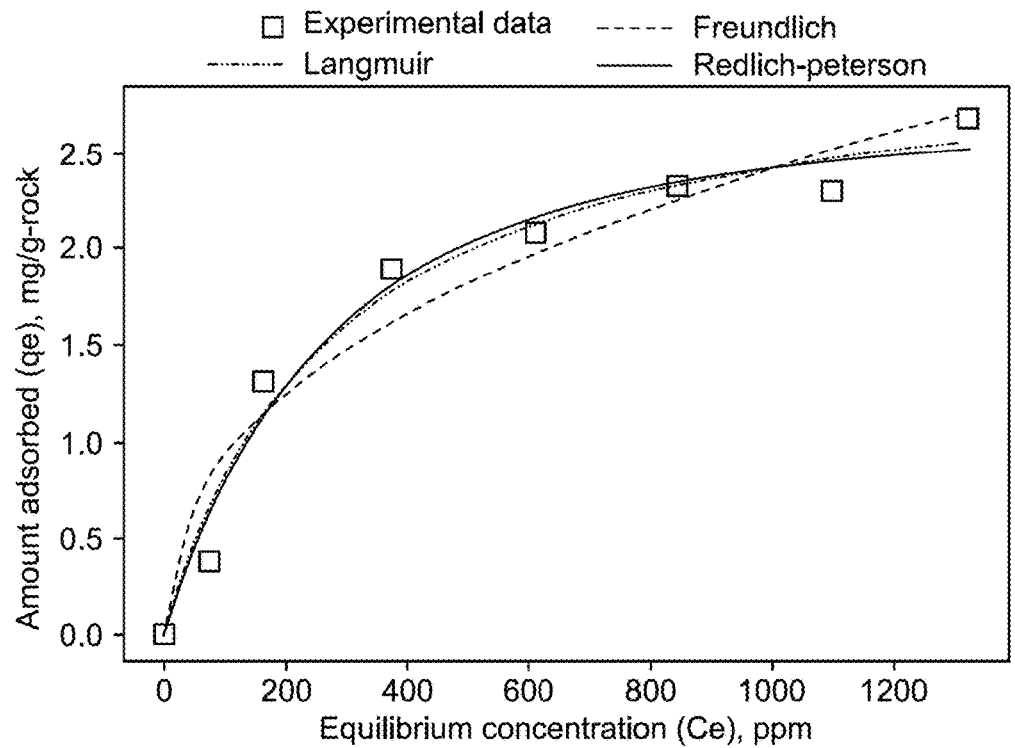
Figure 6B:
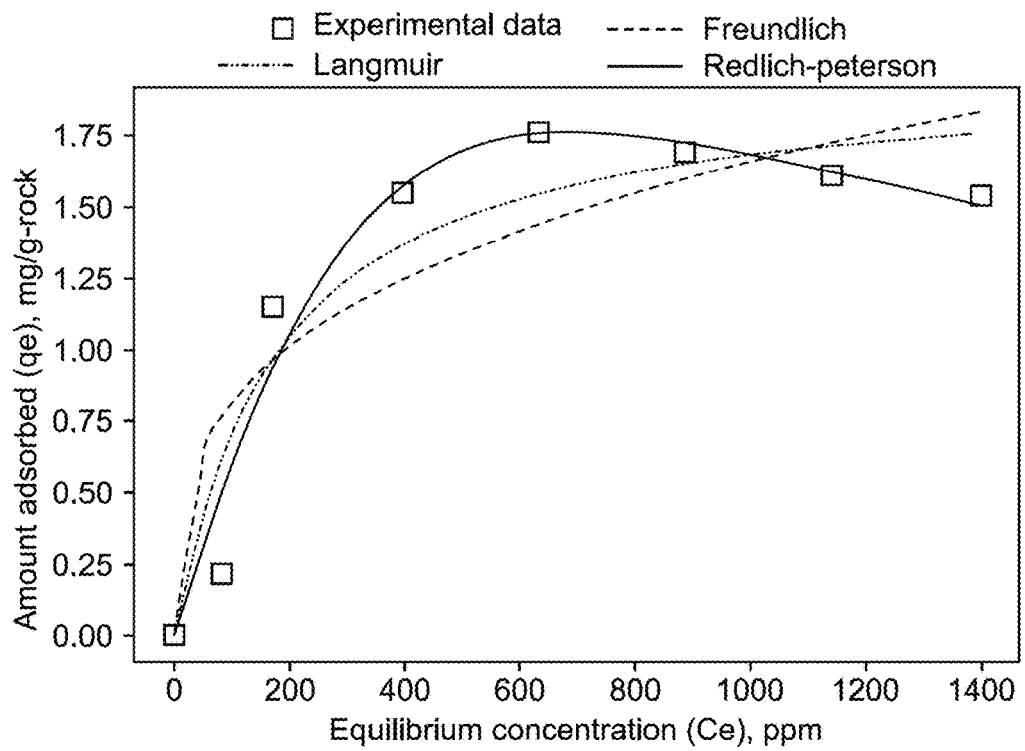
Figure 6C:
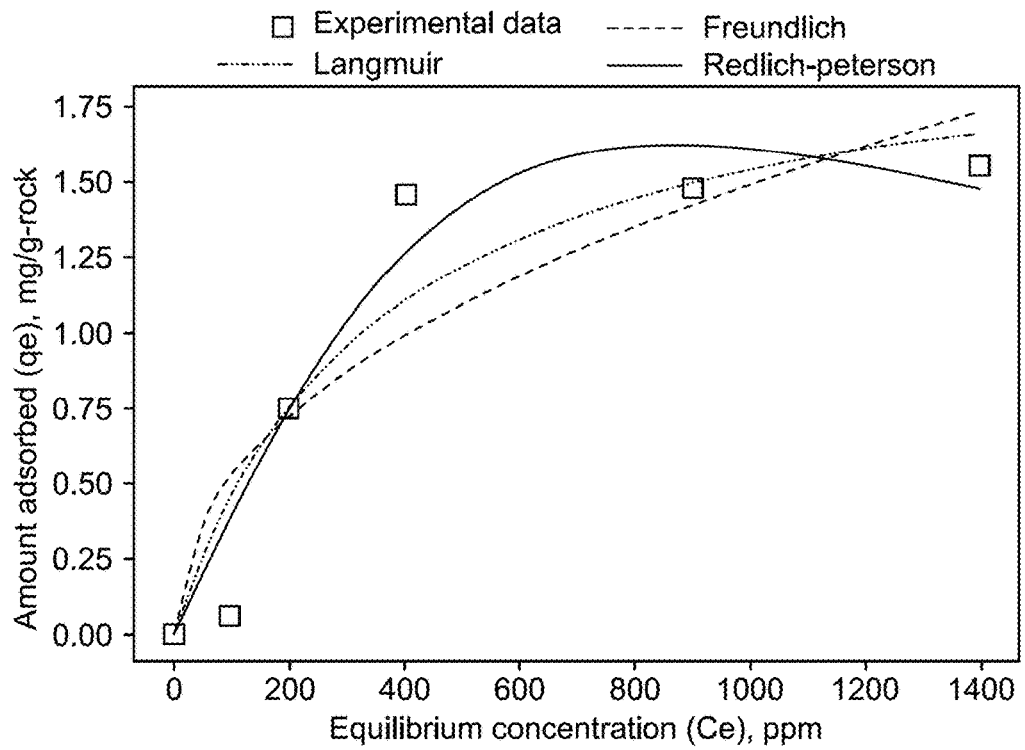

To investigate further, the constructed adsorption isotherms were analyzed using standard adsorption isotherm models. The Levenberg-Marquardt algorithm was employed to perform nonlinear, least-squares curve fitting of the experimental data with the standard models. The objective was to determine the model parameters along with error metrics such as the mean absolute error (MAE), the mean squared error (MSE), and the coefficient of determination ($R^2$) for each adsorbent. FIGS. 6A, 6B, and 6C compare these models, while the model parameters and error metrics are listed in Table 4 and Table 5, respectively. Table 5 shows that the Redlich-Peterson model performed better than the others, with the lowest error and highest $R^2$.

Redlich-Peterson model contains three parameters, integrates the features of both Freundlich and Langmuir and does not assume an ideal monolayer adsorption behavior. However, the Langmuir model assumes monolayer adsorption behavior and shows comparable results to the Redlich-Peterson model.

TABLE 4

Model parameters obtained after curve-fitting the experimental data with adsorption isotherm models

| Rock Type | Langmuir | Freundlich | Redlich-Peterson |
|---|---|---|---|
| Guelph dolomite | $K_L$ = 0.003644<br>$q_o$ = 3.0895 | $K_F$ = 0.1436<br>n = 2.4454 | $K_R$ = 0.00997<br>$\alpha_r$ = 0.001574<br>$\beta_r$ = 1.09876 |
| Guff dolomite | $K_L$ = 0.00562<br>$q_o$ = 1.9789 | $K_F$ = 0.20316<br>n = 3.2947 | $K_R$ = 0.00618<br>$\alpha_r$ = 2.12675 × $10^{-5}$<br>$\beta_r$ = 1.7001 |
| Indiana limestone | $K_L$ = 0.002822<br>$q_o$ = 2.08363 | $K_F$ = 0.06710<br>n = 2.2273 | $K_R$ = 0.003984<br>$\alpha_r$ = 3.37428 × $10^{-6}$<br>$\beta_r$ = 1.8804 |

TABLE 5

Error metrics of the fitted adsorption isotherms

| Rock type | Error metrics | Langmuir | Freundlich | Redlich-Peterson |
|---|---|---|---|---|
| Guelph dolomite | MAE | 0.1125 | 0.1661 | 0.1158 |
|  | MSE | 0.0209 | 0.0472 | 0.0201 |
|  | $R^2$ | 0.9748 | 0.9432 | 0.9758 |
| Guff dolomite | MAE | 0.1692 | 0.2327 | 0.075 |
|  | MSE | 0.0433 | 0.081 | 0.016 |
|  | $R^2$ | 0.8971 | 0.8071 | 0.9619 |
| Indiana limestone | MAE | 0.1438 | 0.1963 | 0.1232 |
|  | MSE | 0.0466 | 0.077 | 0.0272 |
|  | $R^2$ | 0.8924 | 0.8222 | 0.9372 |

Different acids were tried to lower the static adsorption of GS12 on all adsorbents. Adding 1% HCl acid to the surfactant solution lowered static adsorption on Guelph dolomite and Guff dolomite by about 73% and 79%, respectively. A similar test could not be conducted on Indiana limestone because of the fast mineral dissolution. However, the weaker formic acid caused a dramatic reduction in GS12 adsorption. Adding 1% formic acid to the GS12 solution resulted in about 93.4%, 91.4%, and 91.4% adsorption reduction on Guelph dolomite, Guff dolomite, and Indiana limestone, respectively.

Figure 7:
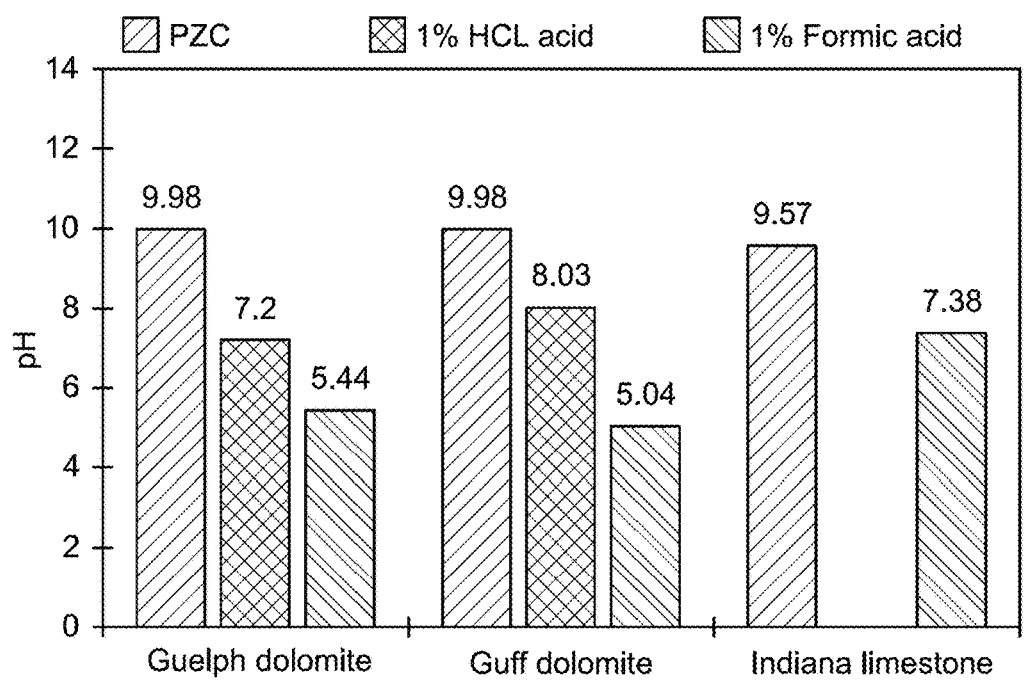
Figure 8:
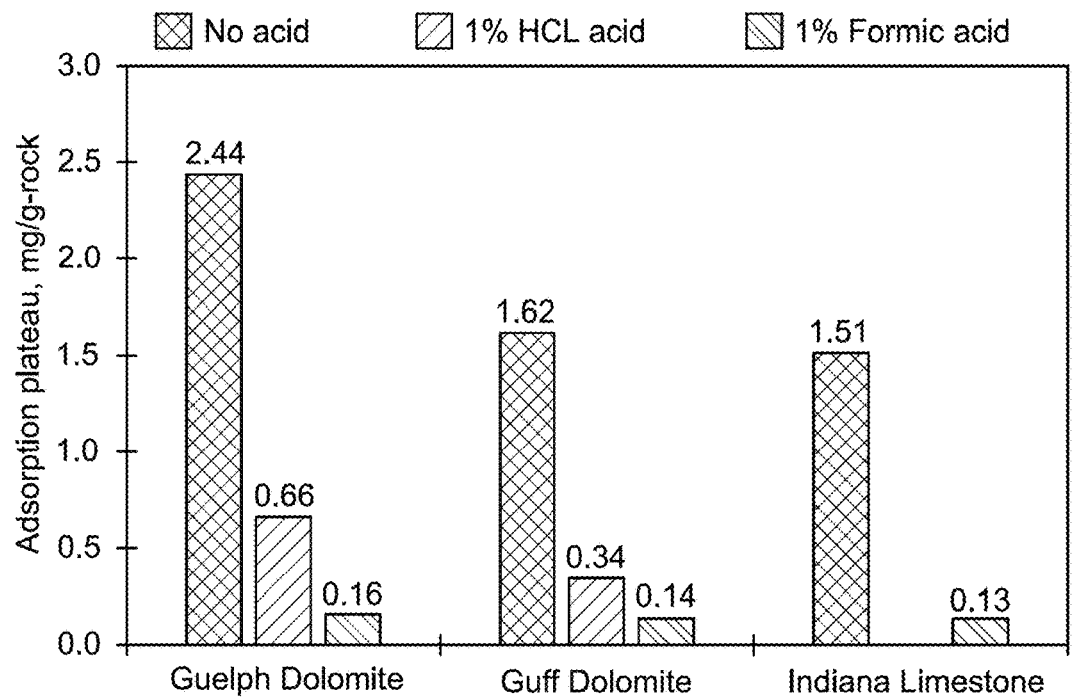
FIG. 8 shows an adsorption reduction on all rocks using different acids at 1500 ppm surfactant concentration, according to certain embodiments.

Referring to FIG. 7, adding HCl and formic acid reduced the surfactant solution's pH below the PZC of the adsorbents. The acidifying surfactant solution results in a more positively charged surface. However, as depicted in FIG. 8, the formic acid produced a pH lower than that of HCl acid at the same concentration, resulting in a larger reduction in GS12 adsorption. The carboxyl group released by the formic acid-rock reaction shields the surfactant from the rock surface resulting in lower adsorption.

Dynamic adsorption of GS12 on Indiana limestone was investigated at 25° C. by two core floods with a GS12 solution at 1500 ppm concentration with and without formic acid at a rate of 0.25 mL/min. This rate corresponds to a superficial velocity of about −0.3 m/day. Formic acid was added to the GS12 solution at 1% concentration in one flood. The core samples' properties are listed in Table 6. After saturating the core sample with deionized water, each test was conducted in two phases: (1) flooding with GS12 solution to capture the adsorption process and (2) flooding with deionized water to capture the desorption process.

Figure 9:
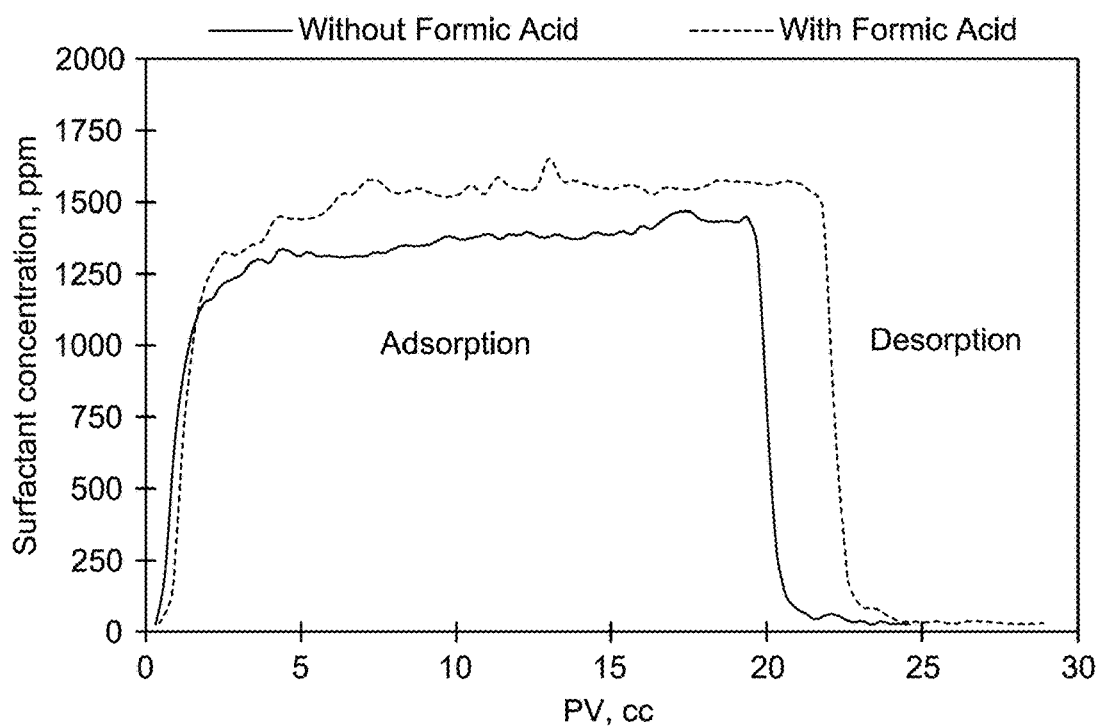
FIG. 9 shows the surfactant concentration profile obtained in core effluent with and without formic acid of two floods, according to certain embodiments.

Referring to FIG. 9, the surfactant concentration profiles in the core effluent of both floods are shown. The surfactant concentration in the effluent increased sharply in both cases till about 2 PVs were injected, then increased gradually till 5 PVs. In the no-acid test, the effluent's surfactant concentration became nearly equal to that of the injectant after 15 PVs. The surfactant flooding was continued till about 19 PVs, followed by waterflooding for the desorption process for another 5 PVs till the effluent did not show any surfactant peak in the HPLC system. However, in the case of formic acid, the injected surfactant concentration was nearly reached in the effluent at about 6 PVs. This flood continued till about 21 PVs, followed by 7 to 8 PVs of waterflooding for the desorption phase.

Figure 10:
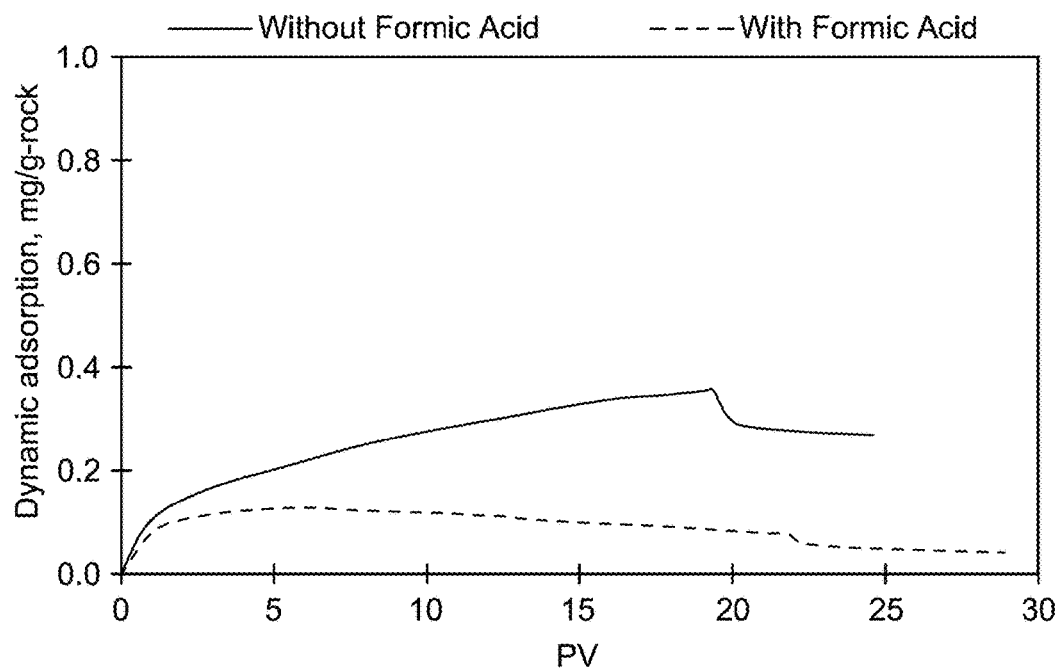
FIG. 10 shows a dynamic adsorption profile of the two core floods, according to certain embodiments.
Figure 11:
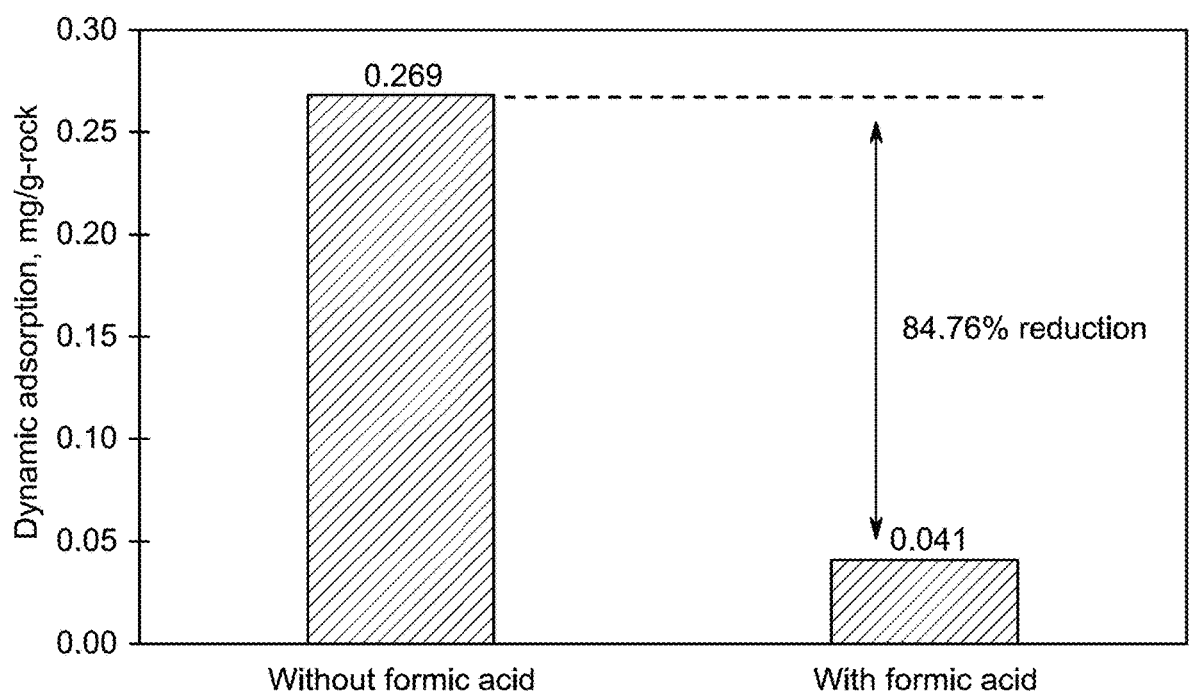
FIG. 11 shows a comparison of dynamic adsorption values of the GS12 with and without formic acid, according to certain embodiments.

Referring to FIG. 10, the dynamic adsorption profile of the two core floods is presented. The addition of formic acid dramatically reduced the surfactant's adsorption. This behavior verifies our static adsorption tests with and without formic acid. Adding formic acid acidified the GS12 solution making the rock surface charge more positive. Thus, the cationic surfactant was repelled, and consequently, its adsorption was reduced. The dynamic adsorption of the GS12 on Indiana limestone with and without formic acid was 0.041 and 0.269 mg/g-rock, respectively, corresponding to an 84.76% reduction in adsorption, as shown in FIG. 11. Comparing these results with static adsorption in FIG. 8 reveals marked reductions of 68% (with acid) and 82% (without acid). These differences are due to the higher surface area of the powdered adsorbents in the static tests.

Figure 12A:
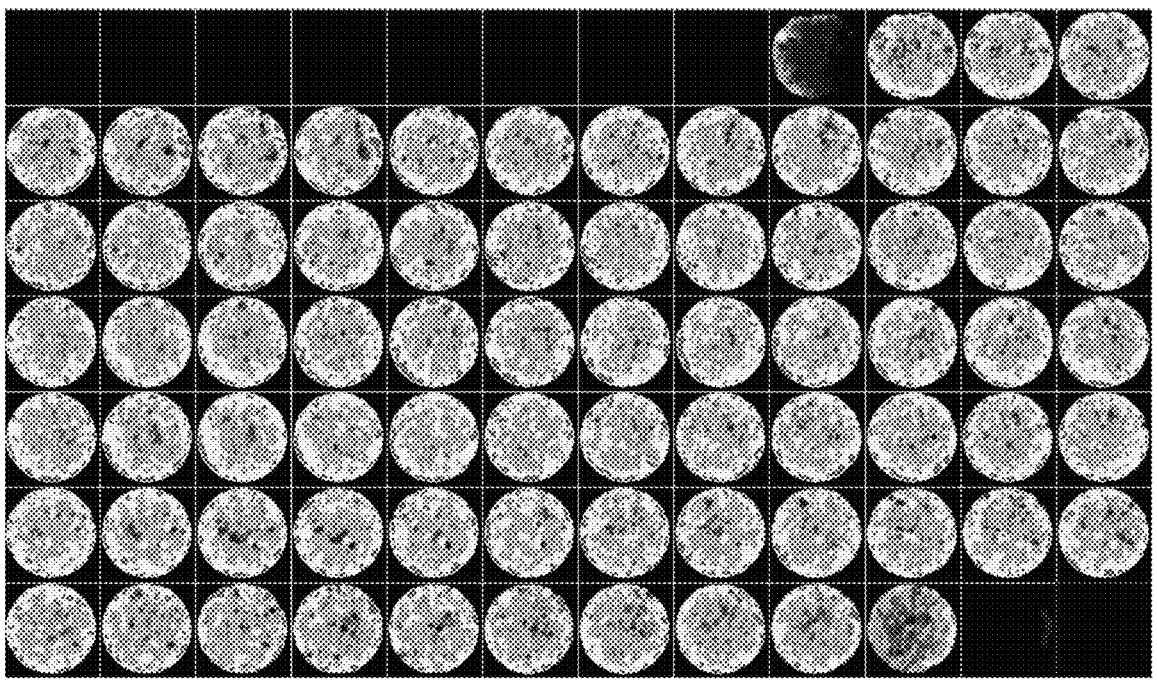
FIG. 12A shows medical computerized tomography (CT)-scan images of the core sample after flooding with the GS12 solution without formic acid, according to certain embodiments.
Figure 12B:
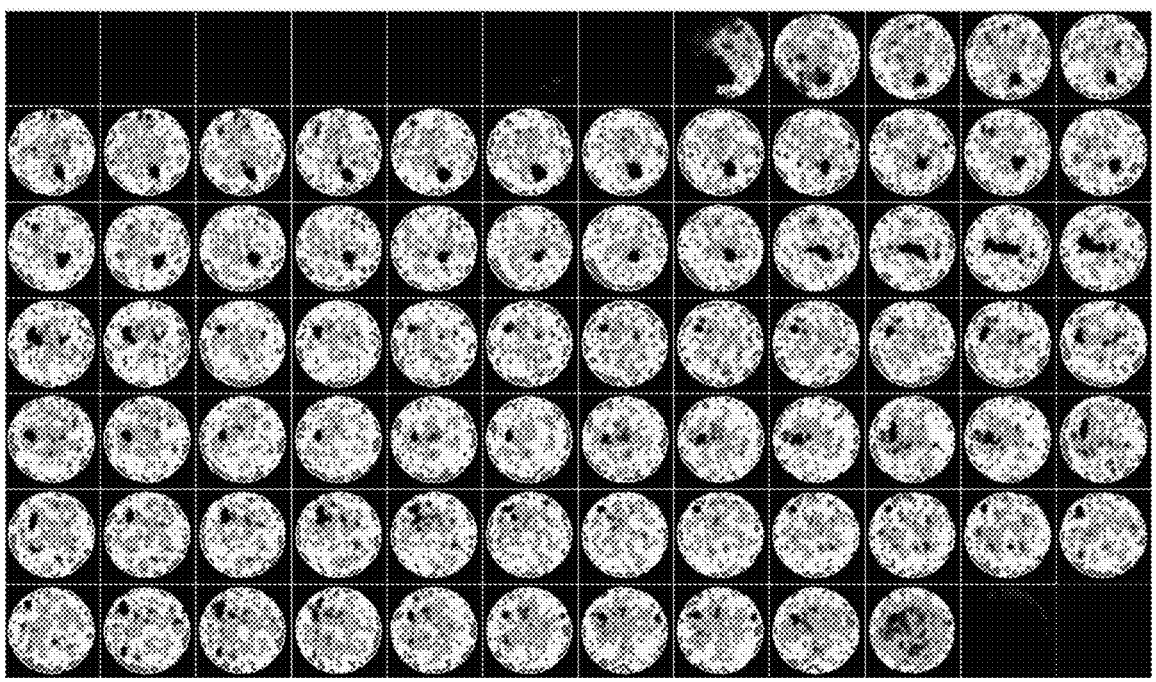
FIG. 12B shows medical CT-scan images of the core sample after flooding with the GS12 solution with formic acid, according to certain embodiments.

Referring to FIGS. 12A and 12B, the medical computerized tomography (CT)-scan images of the core samples after dynamic adsorption tests with and without formic acid in the surfactant solution are shown. The formic acid created wormholes (dark spots in FIG. 12B), which improved the core sample's permeability to 513 mD, as listed in Table 6.

TABLE 6

| | | | | | | | | | Permeability (mD) | |
|---|---|---|---|---|---|---|---|---|---|---|
| Condition | Diameter (mm) | Length (mm) | Dry Weight (g) | Bulk Vol. (ml) | Grain Vol. (ml) | Pore Vol. (ml) | Grain density (g/ml) | Porosity (%) | Before flooding | After flooding |
| Without formic acid | 38.14 | 74.98 | 182.39 | 85.66 | 69.4 | 16.26 | 2.628 | 18.98 | 129 | 190 |
| With formic acid | 38.18 | 76.78 | 200.9 | 87.9 | 75.966 | 11.934 | 2.645 | 13.58 | 64 | 513 |

Figure 13:
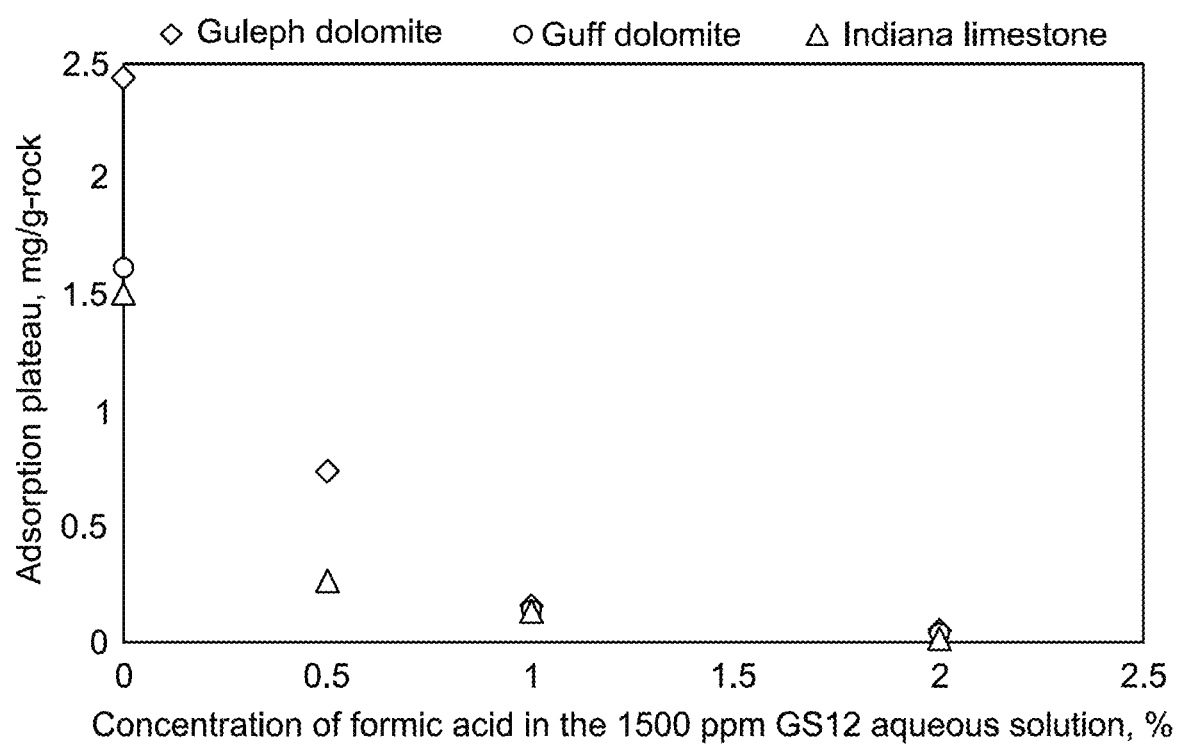
FIG. 13 depicts the effect of formic acid concentration on the adsorption reduction of the GS12 on the carbonate rocks, according to certain embodiments.

Additional static adsorption tests on all three carbonate rocks (Guelph Dolomite, Guff Dolomite, and Indiana Limestone) at different concentrations of the formic acid (0.5% and 2%), and a fixed concentration of the GS12 (1500 ppm) were conducted. A wide range of formic acid concentrations from 0% to 2% were introduced. Referring to FIG. 13, the effect of formic acid concentration on the adsorption reduction of the GS12 on the carbonate rocks is presented. FIG. 13 clearly shows that adding formic acid to the aqueous solution of a cationic gemini surfactant reduces surfactant adsorption on carbonate rocks. Increasing the concentration of formic acid results in further reduction of surfactant adsorption. However, unexpectedly, beyond 1% formic acid concentration, the decrease in surfactant adsorption was found negligible.

Numerous modifications and variations of the present disclosure are possible in light of the above teachings. It is therefore to be understood that within the scope of the appended claims, the invention may be practiced otherwise than as specifically described herein.

The invention claimed is:

1. A method of enhanced oil recovery in a carbonate rock formation, comprising:
    injecting a mixture into the carbonate rock formation comprising an oil composition; and
    extracting the oil composition from the carbonate rock formation,
    wherein the mixture comprises about 98 vol % of an aqueous solution, 0.01-1 vol % of a single gemini cationic surfactant, and 0.1-10 vol % of formic acid based on a total volume of the mixture, and
    wherein during the injecting at least a portion of the gemini cationic surfactant is adsorbed onto the carbonate rock formation, and wherein at least 90% less by volume of the gemini cationic surfactant adsorbs onto the carbonate rock formation compared to a method under the same conditions but without the formic acid,
    wherein the single gemini cationic surfactant is of formula (II)

$$CH_3\text{---}(CH_2)_n\text{---}(OCH_2CH_2)_x\text{---}OCH_2CONH(CH_2)_3\overset{CH_3}{\underset{CH_3}{\overset{|}{\underset{|}{N^+}}}}\text{---}(CH_2)_{12}\text{---}\overset{CH_3}{\underset{CH_3}{\overset{|}{\underset{|}{N^+}}}}(CH_2)_3NHCOCH_2O\text{---}(CH_2CH_2O)_x\text{---}(CH_2)_n\text{---}CH_3 \quad 2Br^-$$

wherein n is 12 and x is 12.

2. The method of claim 1, wherein the carbonate rock formation is limestone.

3. The method of claim 1, wherein the carbonate rock formation is dolomite.

4. The method of claim 1, wherein the carbonate rock formation further comprises at least one impurity selected from the group consisting of quartz, montmorillonite, illite, kaolinite, alunite, pyrite, anorthite, halite, and gypsum.

5. The method of claim 4, wherein the carbonate rock formation comprises 0.1-50 wt. % of the at least one impurity, based on a total weight of the carbonate rock formation.

6. The method of claim 1, wherein the carbonate rock formation has a point of zero charge (PZC) of 9.5 to 10.

7. The method of claim 6, wherein a pH of the mixture is below the PZC of the carbonate rock formation.

8. The method of claim 7, wherein the pH of the mixture is from 5-7.5.

9. The method of claim 1, wherein following the injecting a permeability of the carbonate rock formation increases by at least 5 times.

10. The method of claim 1, wherein the mixture consists of the aqueous solution, the gemini cationic surfactant, and formic acid.

11. The method of claim 1, wherein the aqueous solution comprises at least one ion selected from the group consisting of chloride, sodium, sulfate, magnesium, calcium, and potassium.

12. The method of claim 11, wherein the aqueous solution comprises 1-200,000 ppm of the at least one ion, based on a total mass of the aqueous solution.

13. The method of claim 1, wherein the mixture has a temperature ranging from 70 to 110° C. during the injecting.

14. The method of claim 1, wherein the gemini cationic surfactant has a critical micelle concentration of 10-20 ppm.

* * * * *